Nov. 7, 1933.  C. R. NEESON  1,934,085
MEASURING APPARATUS
Filed April 19, 1930  2 Sheets-Sheet 1

INVENTOR
Charles R. Neeson
BY Edward A. Hathaway
ATTORNEY

Nov. 7, 1933.    C. R. NEESON    1,934,085
MEASURING APPARATUS
Filed April 19, 1930    2 Sheets-Sheet 2

Patented Nov. 7, 1933

1,934,085

UNITED STATES PATENT OFFICE 1,934,085

MEASURING APPARATUS

Charles R. Neeson, New Rochelle, N. Y., assignor, by mesne assignments, to Baldwin-Southwark Corporation, a corporation of Delaware Application April 19, 1930. Serial No. 445,618

12 Claims. (Cl. 221—111)

This invention relates generally to measuring equipment and more particularly to improved volumetric fluid measuring apparatus especially adapted for liquids. While the specific aspect of the invention, as illustrated herein, is of special significance in the field of commercial refrigeration, wherein blocks of ice are manufactured, it will of course be understood that the same is applicable to other fields where it is necessary or desirable to measure given quantities of fluid.

In the manufacture of ice it is desirable to have the blocks of substantially the same weight or volume for various well known reasons. With the usual methods of manufacture a plurality of cans are usually filled simultaneously each with a measured amount of liquid. The liquid for the respective cans is measured in individual compartments or containers, each of which has its own pipe or nozzle for discharging the measured liquid into its respective can. During building of the compartments, it may not be possible to obtain exactly the desired volume, or it may be desired to vary the quantity of liquid to be measured by each compartment irrespective of the accuracy of the compartments per se. In either case it is necessary to effect some adjustment for bringing about the proper measurement.

An object of my invention is to provide improved means for adjusting the volumetric measurement of the liquid. A further object is to provide improved means whereby the adjustable means and its associated structure may be effectively and inexpensively manufactured and will be easy to operate while at the same time being positive in its adjusting action. More specifically, these objects are obtained by the provision of a threaded sleeve adjustably mounted upon a discharge pipe and adapted upon rotation to be adjusted along the threaded pipe to any desired elevation whereby the liquid in a compartment cannot discharge below the level of the threaded sleeve.

A further object is to provide an improved arrangement between the discharge control valve for each compartment and the connection thereof with the filling tank. A more specific object in this respect is to provide improved means whereby a discharge valve and pipe may be removed bodily in such a manner that upon removal an operator may have ready access to the interior of the respective compartments to effect any necessary cleaning action or other desired operation therein. A further object is to provide a simplified arrangement for insuring uniform accuracy throughout a series of measuring operations. In this respect, it is an object of my invention to provide an improved header arrangement through which the filling liquid is supplied to each compartment.

Another object is to provide an improved vent valve arrangement which is particularly effective in insuring positive opening and closure of the vent during each filling operation, and which will reduce leakage to a minimum and prevent excessive discharge of water as has been common in arrangements heretofore proposed.

Other objects and advantages will be more readily seen by those skilled in the art from the following description of the accompanying drawings which illustrate one specific embodiment which the invention may assume, and wherein.

Figure 1:
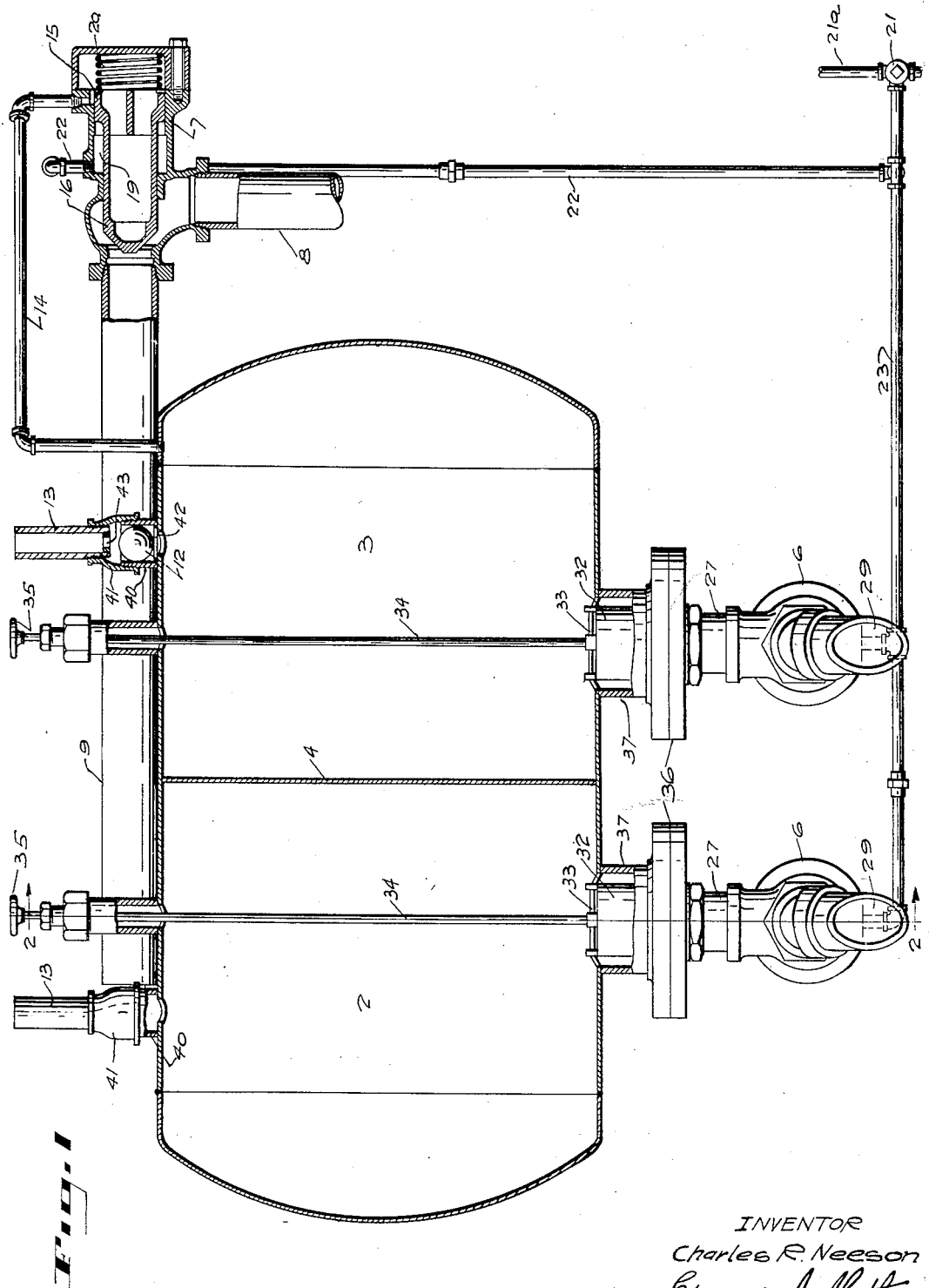
Fig. 1 is a longitudinal vertical section of the tank with parts of the supply and discharge elements shown in elevation.
Figure 2:
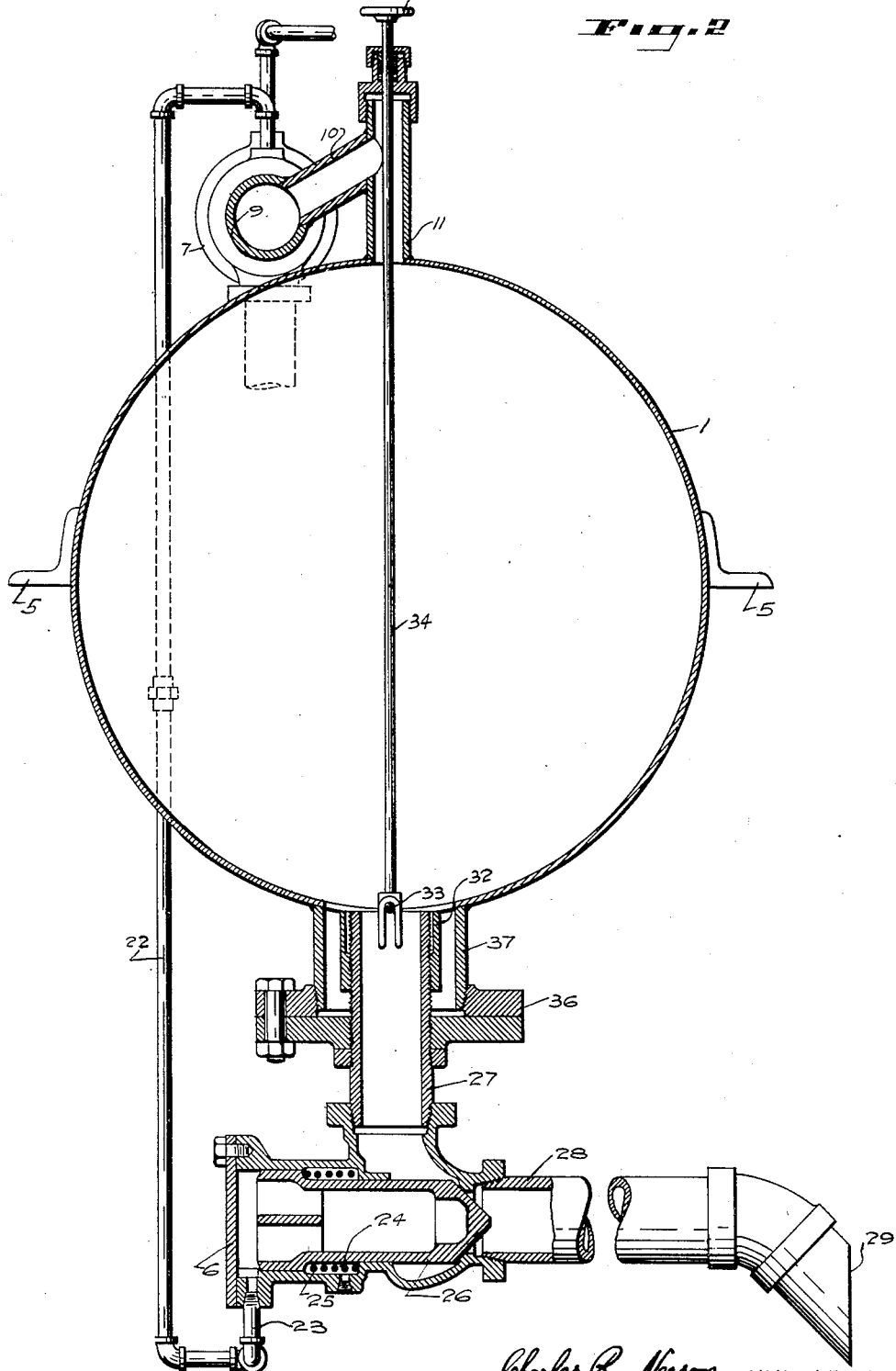
Fig. 2 is a vertical transverse section taken on line 2—2 of Fig. 1.

In the illustrated embodiment of my invention I have shown a tank 1 which in cross section is of circular form although any suitable form may be employed. The tank may be as long as is necessary to provide the requisite number of individual compartments which herein are specifically shown as two in number, at 2 and 3, although a greater or less number may be employed, the compartments preferably being of substantially a uniform predetermined volumetric capacity. The compartments are formed, for instance, by a suitable partition 4 secured by any suitable means to the wall of the tank which may be provided with any exterior supporting brackets in the form of longitudinally extending angle irons 5. Each compartment is provided with its own discharge valve mechanism, generally indicated at 6, while the refilling control valve mechanism common to all compartments is generally indicated at 7. Water is supplied to each compartment from any suitable source through an inlet pipe 8, past the valve mechanism 7 and through a header 9 from which it passes through a series of upwardly extending lateral pipes 10 connected respectively with each of the compartments as by pipes 11. Assuming that the discharge valve mechanisms 6 are all closed, the compartments are filled simultaneously. As the liquid rises to the top of each compartment a float ball check valve 12 is raised against a suitable seat to close atmospheric vent passage 13 which is open during filling to permit complete and rapid filling of each compartment.

Upon closure of these vents discharge of water from the compartments is prevented.

When the compartments all become filled, fluid pressure is transmitted through a pipe 14 to the rear side of an enlarged annular piston head 15 of a plunger valve 16 of the supply control valve. This equalizes the pressure forces acting in the opposite direction on the plunger such, for instance, as the fluid pressure on the end of the plunger nose and also within the annular chamber 19 which is supplied from a suitably controlled source. With the fluid pressure forces thus balanced, the force of a spring 20 is sufficient to effect closing movement of the plunger automatically when the compartment is filled with liquid.

With all of the compartments filled and the supply of liquid shut off, the operator now turns a three-way valve 21, which may be in the form of a plug valve, to discharge fluid from pipes 22 and 23. Annular chamber 19 and fluid pressure in operating chambers 24 in the respective discharge valve mechanisms 6 are simultaneously vented. Upon release of pressure in chamber 24 of the discharge valves a spiral spring 25 encircling the plunger moves the plunger 26 rearwardly to permit fluid to flow from the vertical passage 27 to the discharge pipe 28, the outer end of which is provided with a suitable nozzle 29 for directing the liquid into a can which will be disposed immediately below.

As the measuring compartments discharge, their respective vents 13 will open to prevent any vacuum in the top thereof and thus allow the liquid to discharge freely through the nozzles. As the compartments discharge the fluid pressure on the right end of plunger 16 drops to atmospheric pressure but the supply valve plunger 16 remains closed due to the fact that fluid pressure in the supply pipe 8 is not acting upon the entire surface of the plunger nose and also no fluid pressure is acting upon the front side of the annular piston 15 due to the annular chamber 19 being vented when the three-way valve 21 was turned to allow discharge of the compartments. The spring 20 is therefore sufficient to hold the supply plunger 16 in its closed position while the compartments are discharging.

When the compartments are discharged they may be refilled by the operator simply turning control valve 21 whereby fluid pressure is supplied from a pipe 21a (connected preferably to source pipe 8) through pipe 23 to the rear side of each of the discharge plungers 26 to close the same while at the same time fluid pressure flows through pipe 22 to the annular chamber 19 thereby opening plunger 16 against the force of spring 20. Refilling liquid is then supplied from the main source pipe 8, through header 9 and pipes 10 and 11 to the respective compartments. The compartment upon being filled will again cause fluid pressure to pass through pipe 14 to the rear side of plunger 16 and again close the same. The operator may then again turn valve 21 to vent pipes 22 and 23 and open discharge valve 26 while the supply valve 7 remains closed.

My improved adjusting mechanism includes a sleeve 32 threadedly mounted on the outside of the discharge pipe 27. By adjusting this sleeve along the discharge pipe the level to which the liquid in each compartment discharges may be determined. This adjustment is effected by the provision of a small rod 33 extending across and fixed to only the top edge of the sleeve 32 while a suitable operating rod 34 is adapted to have its open forked end drop over and engage the rod 33 thereby to be rotated by a suitable hand wheel 35 disposed above a suitable packing gland through which the rod 34 extends.

To provide a relatively inexpensive arrangement for connecting the discharge valve mechanisms to their respective compartments and also to permit ready access to the interior of each compartment so that the same may be cleaned if necessary, I have threaded pipe 27 in a flange 36 which is suitably bolted to a cooperating flange carried by an enlarged pipe 37 secured to the tank. By removal of the bolts which hold these two flanges together the valve discharge mechanism and liquid controlling sleeve 32 may be dropped downwardly while letting operating rod 34 remain suspended, whereupon the operator may extend his arm upwardly into the respective compartment to effect the necessary cleaning or other operations.

In connection with the vent valve mechanism, it will be noted that a relatively simple and yet effective arrangement is provided in that a short length of straight pipe 40 suitably secured to the tank as by welding or other means extends into and is threaded to a collar 41, preferably a reducing collar, which in turn is threaded to an overflow pipe 13. The wall of the tank has an opening smaller than the valve and pipe 41 to thus provide a bottom stop for the ball 42. To provide the necessary top seat for the ball valve a flat circular piece of metal 43 is fixed preferably within and at the end of the sleeve 13 as by welding or other means. This plate has an opening therein of sufficient size to permit effective closure thereof by the ball without allowing the ball to be distorted and pushed into the vent opening when held on the seat by fluid pressure within the compartment. The ball is made preferably of solid rubber of such a nature that it floats on water. Inasmuch as the plate is disposed relatively close to the ball valves, and also due to the relatively large diameter of pipe 40 there is little or no tendency for water to shoot upwardly through and out of pipe 13 when the check ball 42 closes upon filling of the compartment.

A further simplified construction resides in the arrangement of the header and the passages leading to each compartment, it being noted that each of the passages leading from the header is formed by simple pieces of straight pipe, preferably welded to each other in the manner shown. By inclining the connecting pipe 10 upwardly fluid cannot flow from the header into any of the respective compartments upon opening of the discharge valves (assuming supply valve to be closed) thereby avoiding any error in the measurement which would otherwise occur if fluid was allowed to drain from the header into the compartment after the measuring operation had taken place and upon opening of the discharge valve. It is thus seen that the elimination of this possibility of error taken with my improved means for varying the volumetric measurement of the compartments provides an arrangement which when once rendered accurate will maintain its accuracy.

While I have illustrated one specific form which the invention may assume it will of course be understood that various other modifications and rearrangements of parts may be employed without departing from the spirit of the invention as set forth in the appended claims.

I claim:

1. A measuring apparatus comprising means forming a closed compartment for containing fluid under pressure above atmosphere, means forming a discharge passage therefor at one side of said compartment, rotatable means adapted upon rotation to positively adjust the elevation of the compartment end of said discharge passage, and means for adjusting said rotatable means extending through the side of said compartment opposite to said discharge side.

2. A measuring apparatus comprising means forming a compartment, a discharge passage therefor at one side thereof, means whereby the volume of liquid to be measured may be adjusted including a pair of cooperating relatively rotatable elements having means for positively effecting relative axial movement therebetween upon said relative rotation, and means for operating said adjusting means extending through the side of said compartment opposite to said discharge side.

3. An apparatus for measuring fluids comprising means forming a closed compartment for containing fluid under pressure above atmosphere, a discharge pipe leading from the lower portion thereof, and a collar having threaded engagement with the inner end of said pipe whereby upon relative rotation between said collar and pipe the volume of fluid to be measured may be adjusted and a rod for operating said collar extending through the top of said compartment opposite to said discharge pipe.

4. A liquid measuring apparatus comprising means forming a compartment, a discharge passage therefor disposed at one side of said compartment, adjustable means whereby the volume of fluid to be measured may be adjusted, and operating means, for said adjustable means, extending to the exterior of the compartment through a side thereof opposite to said discharge side and having provision whereby the operating means and adjustable means may be disconnected by relative linear movement therebetween.

5. A liquid measuring apparatus comprising means forming a compartment, a discharge passage therefor, means for adjusting the elevation of the inner end of said passage including a pair of cooperating relatively rotatable threaded elements, an operating member extending through said compartment from the exterior thereof, and means for releasably directly connecting said operating member with one of said relatively adjustable threaded elements.

6. Measuring apparatus comprising means forming a compartment, means forming a passage communicating therewith, and means forming a discharge passage insertable within said communicating passage from the exterior of said compartment and having provision for being mechanically detachably removable from said communicating passage whereby said passage may be used as a hand hole whenever desired.

7. A liquid measuring apparatus comprising means forming a compartment, means forming an enlarged passage communicating therewith, means forming a discharge passage insertable within and spaced from the wall of said enlarged passage, adjustable means associated with said means which forms said discharge passage whereby the volume of liquid to be measured may be adjusted, and operating means for effecting said adjustment and having provision whereby it is adapted to remain in substantially its normal position upon removal of said discharge passage.

8. A measuring apparatus comprising, in combination, means forming a compartment, means forming an enlarged passage communicating therewith, a member extending transversely of said passage and having an opening therethrough, mechanical means arranged for normally removably securing said transverse member to said passage forming means whereby access may be easily had to the interior of said passage, a discharge pipe extending into said opening and secured to said transverse member, a discharge valve associated with the lower end of said discharge pipe, and adjustable means associated with the inner end of said pipe for determining the volume of the contents to be measured.

9. A liquid measuring apparatus comprising means forming a compartment, means forming an enlarged passage communicating therewith, a member extending transversely of the lower end of said passage for closing the same and provided with an opening, means for removably threadedly attaching said transverse member to said enlarged passage forming means, a discharge pipe extending through said opening and into said enlarged passage, means for securing said discharge pipe in position with respect to said opening, and means axially adjustable relative to said pipe to vary the level to which the liquid in said compartment may fall when the compartment is being discharged.

10. A liquid measuring apparatus comprising means forming a compartment, means forming an enlarged passage communicating therewith, a member disposed transversely of the lower end of said passage and having provision for being removably mechanically attached to said enlarged passage forming means, said transverse member also having a threaded opening therethrough, a discharge pipe externally threaded for a substantial axial distance and extending through and having threaded engagement with the threads of said opening, and a collar adjustably threadedly mounted upon the upper threaded end of said discharge pipe thereby to adjust the level to which the liquid in the compartment may fall.

11. A liquid measuring apparatus comprising means forming a compartment, means having a threaded opening communicating with said compartment, means forming an externally threaded discharge pipe extending through and having threaded engagement with the threads of said opening, and a liquid level adjusting collar disposed near the inner end of said discharge pipe and having threaded engagement therewith as by the external threads thereof.

12. A liquid measuring apparatus comprising means forming a compartment, means having a threaded opening communicating with said compartment, a discharge pipe externally threaded for a substantial distance and extending through and having threaded engagement with the threads of said opening, a liquid level adjusting collar disposed near the inner end of said discharge pipe and having threaded engagement therewith as by the external thread thereof, and a discharge valve associated with the lower end of said discharge pipe.

C. R. NEESON.